J. DWYER.
MITER CUTTING DEVICE.
APPLICATION FILED JULY 25, 1919.

1,339,747.

Patented May 11, 1920.

INVENTOR
JOSEPH DWYER
By Fetherstonhaugh & Co.
attys.

UNITED STATES PATENT OFFICE.

JOSEPH DWYER, OF HAMILTON, ONTARIO, CANADA.

MITER-CUTTING DEVICE.

1,339,747.  Specification of Letters Patent.  Patented May 11, 1920.

Application filed July 25, 1919. Serial No. 313,201.

*To all whom it may concern:*

Be it known that I, JOSEPH DWYER, of the city of Hamilton, in the county of Wentworth, Province of Ontario, Dominion of Canada, have invented certain new and useful Improvements in Miter-Cutting Devices, of which the following is the specification.

My invention relates to improvements in miter cutting devices and the object of the invention is to construct a device which will be more portable than the miter boxes at present in use. A further object is to construct a device which will take any depth of material which is not the case with the ordinary miter boxes.

My invention consists of a bracket designed to be secured to a table or bench, a saw guide and an arm hinged to the top of the bracket at one end and secured to the saw guide at the other whereby the relative angle between the saw guide and the bracket can be varied for cutting different miters.

My invention consists of the parts constructed and arranged as hereinafter more particularly described and illustrated in the accompanying drawing, in which:—

Like characters of reference indicate corresponding parts in the various figures.

Figure 1:
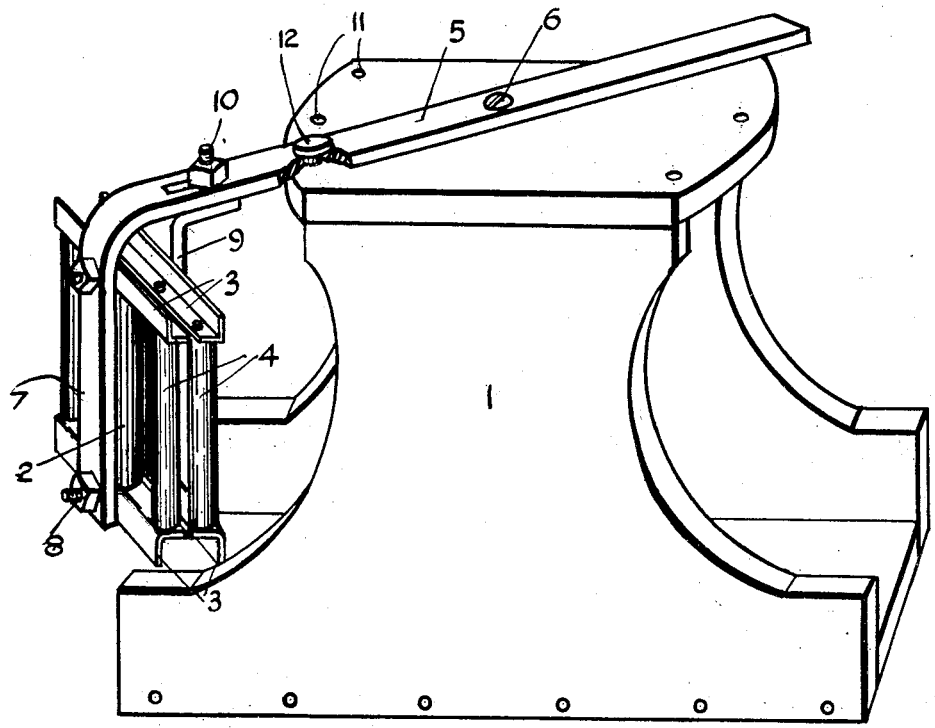
Figure 1 represents a perspective view of a device constructed according to my invention.
Figure 2:
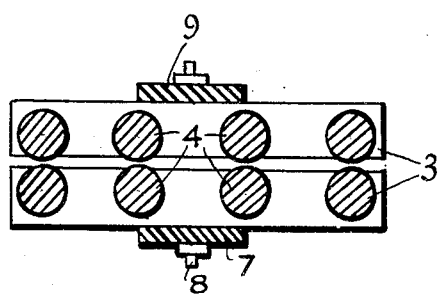
Fig. 2 is a horizontal section of the saw guard.

1 is a bracket which is designed to be secured to a table or bench. 2 is a saw guide which is constructed in two parts each provided with top and bottom angle iron plates 3. 4 are rollers revolubly mounted on the angle iron plates. 5 is the saw guide supporting arm suitably hinged to the top of the bracket 1 by the screw 6. One end 7 of the arm 5 is turned down and the saw guide is adapted to be secured thereto by the bolts 8. 9 is a depending arm adjustably secured to the supporting arm 5 by the bolt 10, and also secured to the inner face of the saw guide.

11 are holes in the top of the bracket 1 and 12 is a pin extending through the hole in the supporting arm 5, such hole being designed to register with each of the holes 11, upon the arm 5 being swung over the same.

The operation of the device is as follows:—

The bracket 1 is secured to the table or bench and the wood to be cut is rested against the side of the bracket; by adjusting the arm 5 the saw guide 2 can be set at any desired angle; the saw is inserted between the divided portions of the saw guide and the wood cut in the ordinary manner.

The rollers 4 prevent any friction between the saw and the saw guide and the arm 9 being adjustably connected to the supporting arm 5 the width of the slot between the two divided portions of the saw guide can be varied to take saws of different thicknesses.

What I claim as my invention is:

1. A miter cutting device including a saw guide divided into two spaced parts each consisting of upper and lower frame members connected by vertically disposed freely rotatable rollers, means for supporting said guide for angular adjustment, and means for relatively adjusting the two parts of the guide.

2. A miter cutting device including a saw guide divided into two opposing parts, a supporting structure including an angular adjustable arm carrying one part of the saw guide, and a second arm adjustably secured to the first-mentioned arm, and carrying the other part of the saw guide.

3. A miter cutting device comprising in combination a bracket, a supporting arm pivoted to the bracket and provided with a depending portion, a depending arm adjustable longitudinally of the supporting arm and opposing the dependent portion of said supporting arm, and a saw guide divided into two parts carried respectively by the depending portion of the supporting arm and by the adjustable depending arm.

4. In a miter cutting device, the combination with a bracket, of a saw guide divided into two spaced parts, a supporting arm pivoted to the bracket carrying one part of the guide, and an arm adjustably secured to the supporting arm carrying the other part of the guide, and means for varying the angle between the guide and the bracket face.

JOSEPH DWYER.

Witnesses:
GERTRUDE NICHOLSON,
M. B. GUEST.